US012581182B2

(12) United States Patent
 Jang et al.

(10) Patent No.: US 12,581,182 B2
(45) Date of Patent: Mar. 17, 2026

(54) ELECTRONIC DEVICE COMPRISING IMAGE SENSOR AND DYNAMIC VISION SENSOR, AND OPERATING METHOD THEREFOR

(71) Applicant: Samsung Electronics Co., Ltd., Gyeonggi-do (KR)

(72) Inventors: Jongwoon Jang, Gyeonggi-do (KR); Jinhyun Kim, Gyeonggi-do (KR); Sungoh Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 54 days.

(21) Appl. No.: 18/519,683

(22) Filed: Nov. 27, 2023

(65) Prior Publication Data

US 2024/0098347 A1 Mar. 21, 2024

Related U.S. Application Data

(63) Continuation of application No. PCT/KR2022/006834, filed on May 12, 2022.

(30) Foreign Application Priority Data

May 25, 2021 (KR) ........................ 10-2021-0067115

(51) Int. Cl.
 *H04N 23/61* (2023.01)
 *H04N 1/21* (2006.01)
 (Continued)

(52) U.S. Cl.
 CPC ........... *H04N 23/61* (2023.01); *H04N 1/2133* (2013.01); *H04N 23/45* (2023.01); *H04N 25/47* (2023.01)

(58) Field of Classification Search
 CPC ...... H04N 1/2133; H04N 23/45; H04N 23/57; H04N 23/61; H04N 23/611; H04N 25/47
 See application file for complete search history.

(56) References Cited

U.S. PATENT DOCUMENTS

| | | | |
|---|---|---|---|
| 9,734,872 B2 | 8/2017 | Li | |
| 2003/0053537 A1 | 3/2003 | Kim et al. | |

(Continued)

FOREIGN PATENT DOCUMENTS

| | | |
|---|---|---|
| CN | 106982341 | 7/2017 |
| JP | 2020-162000 | 10/2020 |

(Continued)

OTHER PUBLICATIONS

International Search Report dated Aug. 19, 2022 issued in Application No. PCT/KR2022/006834, pp. 5.

(Continued)

*Primary Examiner* — Daniel M Pasiewicz
(74) *Attorney, Agent, or Firm* — The Farrell Law Firm, P.C.

(57) ABSTRACT

An electronic device includes an image sensor; a dynamic vision sensor (DVS); and at least one processor electrically connected to the image sensor and the DVS. The at least one processor shoots video by using the image sensor, determines the moving speed of a subject by using the DVS during the video shooting, determines the frame rate of the image sensor on the basis of the moving speed, controls that the image sensor outputs, on the basis of the frame rate, a plurality of image frames including the subject, and acquires a hyperlapse video on the basis of the plurality of image frames.

20 Claims, 7 Drawing Sheets

(51) Int. Cl.
    *H04N 23/45*        (2023.01)
    *H04N 25/47*        (2023.01)

(56)               References Cited

U.S. PATENT DOCUMENTS

| | | |
|---|---|---|
| 2010/0053345 A1 | 3/2010 | Kim et al. |
| 2010/0092151 A1 | 4/2010 | Miyakoshi |
| 2012/0176505 A1 | 7/2012 | Kim et al. |
| 2012/0327269 A1 | 12/2012 | Hwang et al. |
| 2015/0341592 A1 | 11/2015 | Chen et al. |
| 2017/0084044 A1 | 3/2017 | Keh et al. |
| 2017/0180589 A1 | 6/2017 | Guo et al. |
| 2017/0180653 A1 | 6/2017 | Kang et al. |
| 2017/0223308 A1 | 8/2017 | Chen et al. |
| 2020/0034524 A1 | 1/2020 | Han |
| 2020/0053401 A1 | 2/2020 | Obara |
| 2020/0244884 A1 | 7/2020 | Baek |
| 2020/0404164 A1 | 12/2020 | Wu et al. |
| 2021/0051269 A1 | 2/2021 | Lee et al. |

| | | | |
|---|---|---|---|
| 2022/0201204 A1 | 6/2022 | Hirata et al. | |
| 2022/0301351 A1* | 9/2022 | Zhao | G06V 10/454 |
| 2023/0247287 A1* | 8/2023 | Jiang | H04N 23/63 |

FOREIGN PATENT DOCUMENTS

| | | |
|---|---|---|
| KR | 10-2005-0097749 | 10/2005 |
| KR | 10-2014-0100151 | 8/2014 |
| KR | 10-1467875 | 12/2014 |
| KR | 10-2017-0035240 | 3/2017 |
| KR | 10-2017-0074538 | 6/2017 |
| KR | 10-1822655 | 1/2018 |
| KR | 10-2019-0104929 | 9/2019 |
| KR | 10-2020-0092631 | 8/2020 |

OTHER PUBLICATIONS

Written Opinion dated Aug. 19, 2022 issued in Application No. PCT/KR2022/006834, pp. 5.
Korean Office Action dated Jan. 26, 2026 issued in counterpart application No. 10-2021-0067115, 13 pages.

\* cited by examiner

ELECTRONIC DEVICE COMPRISING IMAGE SENSOR AND DYNAMIC VISION SENSOR, AND OPERATING METHOD THEREFOR

CROSS-REFERENCE TO RELATED APPLICATION(S)

This application is a Bypass Continuation application of International Application No. PCT/KR2022/006834, which was filed on May 12, 2022, and is based on and claims priority under 35 U.S.C. § 119 to Korean Patent Application No. 10-2021-0067115, which was filed in the Korean Intellectual Property Office on May 25, 2021, the entire disclosure of each of which is incorporated herein by reference.

BACKGROUND

1. Field

Embodiments of the disclosure relate to a technique for acquiring a moving image by using an image sensor and a dynamic vision sensor.

2. Description of the Related Art

As functions of mobile devices have been recently diversified, the demand for improvement of an image shooting function using a mobile device has also increased. Accordingly, electronic devices provide various video shooting functions. The video shooting function provided by electronic devices may include a slow motion function and a hyperlapse function. The slow motion function refers to a function that replays a video for a longer time than the actual shooting time. For example, an electronic device may acquire 960 frames for 1 second and then may replay a slow motion video at frame per second (fps) for 32 seconds. The hyperlapse function refers to a function that replays a video for a shorter time than the actual shooting time. For example, an electronic device may replay a video shot for 1 hour for 1 minute.

According to a related-art technology, an image sensor outputs image frames at a fixed frame rate regardless of a playback speed of a hyperlapse video. For example, even when an electronic device shoots a video of 1× playback speed, an image sensor may output image frames at 30 frame per second (fps) and, even when the electronic device shoots a hyperlapse video of 4× playback speed, the image sensor may output image frames at 30 fps. If a frame rate of the image sensor is fixed, the electronic device may drop some of the image frames through a sampling process. When the electronic device acquires an image frame that is not included in the hyperlapse video (for example, an image frame that is dropped through the sampling process), there may be a problem in that current consumption of the image sensor unnecessarily increases.

SUMMARY

According to an embodiment, an electronic device may include an image sensor; a dynamic vision sensor (DVS); and at least one processor electrically connected with the image sensor and the DVS. The at least one processor may shoot a video by using the image sensor, may determine a moving speed of a subject by using the DVS while shooting the video, may determine a frame rate of the image sensor based on the moving speed, may control the image sensor to output a plurality of image frames including the subject, based on the frame rate of the image sensor, and may acquire a hyperlapse video based on the plurality of image frames.

According to an embodiment, an operating method of an electronic device may include shooting a video by using an image sensor included in the electronic device; determining a moving speed of a subject by using a DVS included in the electronic device while shooting the video; determining a frame rate of the image sensor based on the moving speed; controlling the image sensor to output a plurality of image frames including the subject, based on the frame rate of the image sensor; and acquiring a hyperlapse video based on the plurality of image frames.

According to an embodiment, an electronic device may include an image sensor; a DVS; and at least one processor electrically connected with the image sensor and the DVS. The at least one processor may shoot a video by using the image sensor, may determine a moving speed of a subject by using the DVS while shooting the video, may determine a playback speed of a hyperlapse video based on the moving speed, may determine a frame rate of the image sensor based on the playback speed and a frame rate of the hyperlapse video, may control the image sensor to output a plurality of image frames including the subject, based on the frame rate of the image sensor, and may acquire the hyperlapse video based on the plurality of image frames.

BRIEF DESCRIPTION OF THE DRAWINGS

The above and other aspects, features and advantages of certain embodiment of the disclosure will be more apparent from the following detailed description, taken in conjunction with the accompanying drawings, in which.

DETAILED DESCRIPTION

According to various embodiments, an electronic device may change a frame rate of an image sensor while shooting a hyperlapse video. The image sensor may not output unnecessary image frames, and thus, a capacity of data output by the image sensor may be reduced and battery consumption may be reduced.

Figure 1:
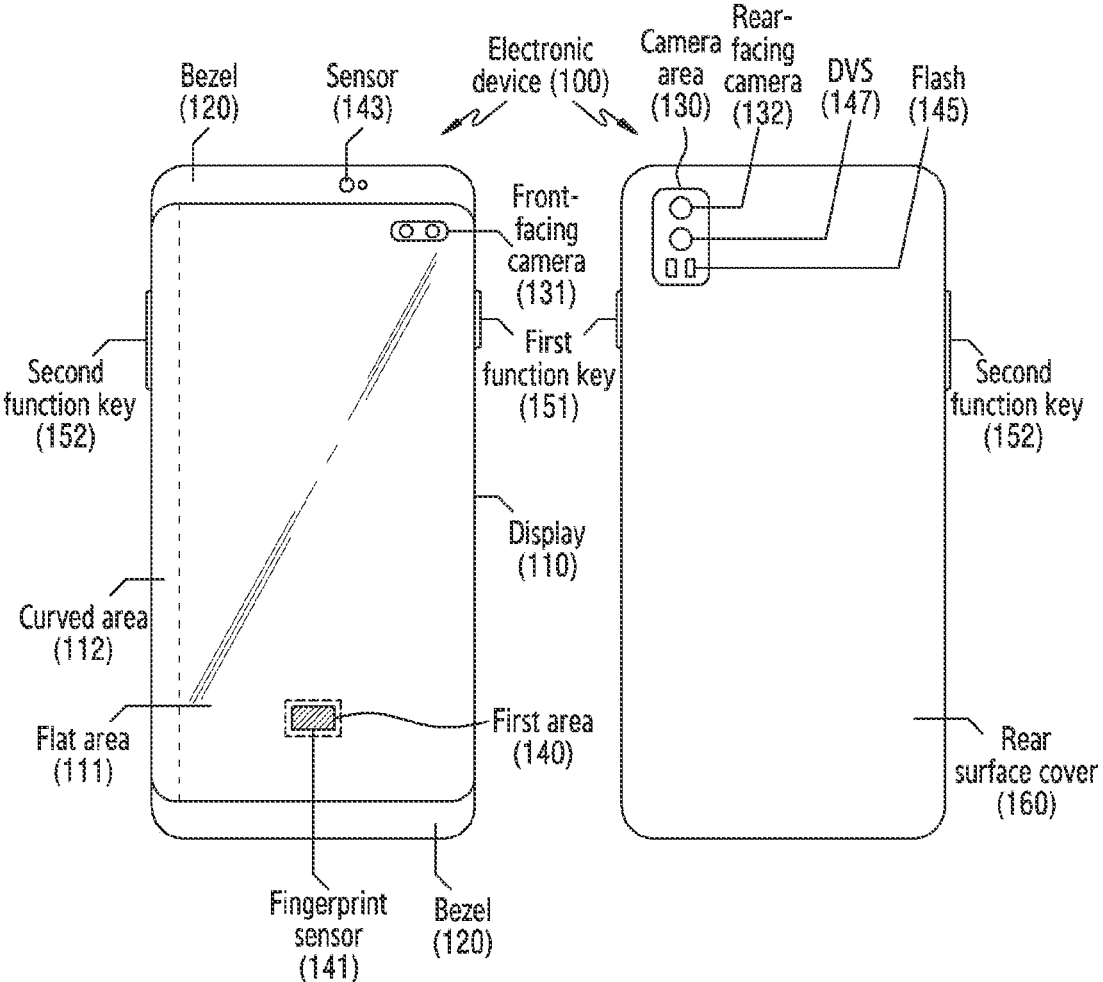
FIG. 1 illustrates an electronic device, according to an embodiment.

FIG. 1 illustrates an electronic device 100, according to an embodiment.

Referring to FIG. 1, a display 110 may be disposed on a front surface of the electronic device 100. The display 110 may occupy most of the front surface of the electronic device 100. The display 110 and a bezel 120 area enclosing at least part of the periphery of the display 110 may be disposed on the front surface of the electronic device 100. In the example of FIG. 1, the display 110 may include a flat area 111 and a curved area 112 extending from the flat area 111 toward a side surface of the electronic device 100. Although FIG. 1 illustrates the curved area disposed on one side (for example, the left side), it will be understood that the same curved area may be formed on the opposite side. In addition, the electronic device 100 illustrated in FIG. 1 is merely an example and various embodiments are possible. For example, the display 110 of the electronic device 100 may include only the flat area 111 without the curved area 112 or may include the curved area 112 formed only on the periphery of one side rather than both sides. In addition, the curved area may extend toward a rear surface of the electronic device 100 to provide an additional flat area to the electronic device 100.

A fingerprint sensor 141 may be included in a first area 140 of the display 110 to detect a user's fingerprint. The fingerprint sensor 141 may be disposed on a lower layer of the display 110, such that the fingerprint sensor 141 is not visible to a user or is difficult to recognize. In addition, an additional sensor for authenticating a user/biometric data may be disposed on a certain area of the display 110 in addition to the fingerprint sensor 141. In another embodiment, the sensor for authenticating the user/biometric data may be disposed in a certain area of the bezel 120. For example, an infrared (IR) sensor for authenticating iris may be exposed through a certain area of the display 110 or may be exposed through a certain area of the bezel 120.

A sensor 143 may be included in at least a certain area of the bezel 120 or at least a certain area of the display 110 of the electronic device 100. The sensor 143 may be a sensor for detecting a distance and/or a sensor for detecting an object. The sensor 143 may be disposed at a distance adjacent to a camera module (for example, a front-facing camera 131, a rear-facing camera 132) or may be provided as a single module with the camera module. For example, the sensor 143 may operate as at least a part of an IR camera (for example, a time of flight (TOF) camera, a structured light camera), or may operate as at least a part of a sensor module.

The front-facing camera 131 may be disposed on the front surface of the electronic device 100. Although the front-facing camera 131 is exposed through a certain area of the display 110 in the embodiment of FIG. 1, the front-facing camera 131 may be exposed through the bezel 120 in another embodiment.

At least one or more of the sensor module, the camera module (for example, the front-facing camera 131, the rear-facing camera 132) and a light emitting element (for example, a light emitting diode (LED)) may be disposed on a back surface of a screen display area (for example, the flat area 111, the curved area 112) of the display 110.

The camera module may be disposed on a back surface of the front surface, the side surface, and/or the rear surface of the electronic device 100 to face the front surface, the side surface and/or the rear surface. For example, the front-facing camera 131 may be a under display camera (UDC) that is not visually exposed to the screen display area (for example, the flat area 111, the curved area 112), and is hidden. The electronic device 100 may include one or more front-facing cameras 131. For example, the electronic device 100 may include two front-facing cameras such as a first front-facing camera and a second front-facing camera. The first front-facing camera and the second front-facing camera may be the same kind of cameras having the same specification (for example, pixels), or the first front-facing camera and the second front-facing camera may be implemented by cameras of different specifications. The electronic device 100 may support a function related to a dual camera (for example, 3D photography, auto-focus, etc.) through the two front-facing cameras.

The rear-facing camera 132 may be disposed on the rear surface of the electronic device 100. The rear-facing camera 132 may be exposed through a camera area 130 of a rear surface cover 160. The electronic device 100 may include a plurality of rear-facing cameras disposed in the camera area 130. For example, the electronic device 100 may include two or more rear-facing cameras. Also, the electronic device 100 may include a first rear-facing camera, a second rear-facing camera, and a third rear-facing camera. The first rear-facing camera, the second rear-facing camera, and the third rear-facing camera may have different specifications. For example, the first rear-facing camera and the second rear-facing camera and/or the third rear-facing camera may be different from one another in terms of field of view (FOV), pixels, aperture, support of optical zoom/digital zoom, support of optical image stabilization (OIS), type and/or arrangement of lens sets included in each camera. For example, the first rear-facing camera may be a normal camera, the second rear-facing camera may be a camera for wide shooting (e.g., a wide-angle camera), and the third rear-facing camera may be a camera for telephotography. In certain embodiments, explanations of functions or characteristics of the front-facing camera may be applied to the rear-facing camera or vice versa.

A variety of hardware or sensors for assisting shooting such as a flash 145 may be additionally disposed in the camera area 130. For example, various sensors such as a distance sensor for detecting a distance between a subject and the electronic device 100 may further be included.

The distance sensor may be disposed at a distance adjacent to the camera module (for example, the rear-facing camera 132), or may be provided as one module with the camera module. For example, the distance sensor may operate as a part of the IR camera (for example, a TOF camera, a structured light camera) or may operate as at least a part of the senor module. For example, the TOF camera may operate as at least a part of the sensor module for detecting a distance to a subject.

A dynamic vision sensor (DVS) 147 may be disposed in the camera area 130. The DVS 147 may be disposed at a distance adjacent to the rear-facing camera 132 or may be provided as one module with the rear-facing camera 132.

At least one physical key may be disposed on a side surface of the electronic device 100. For example, a first function key 151 may be disposed on a right periphery with reference to the front surface of the electronic device 100 to turn on/off the display 110 or to turn on/off the power of the electronic device 100. A second function key 152 may be disposed on a left periphery with reference to the front surface of the electronic device 100 to control a volume or screen brightness of the electronic device 100. In addition, an additional button or key may be disposed on the front surface or rear surface of the electronic device 100. For example, a physical button or a touch button mapped onto a specific function may be disposed on a lower end area of the bezel 120 of the front surface. The electronic device 100 illustrated in FIG. 1 is one example and does not limit the type of an electronic device to which the technical concept of the disclosure is applied. For example, the technical concept of the disclosure may be applied to a foldable electronic device which employs a flexible display and a hinge structure and is foldable in the horizontal direction or vertical direction. In addition, although the electronic device 100 in the illustrated example has an exterior of a bar type or a plate type, various embodiments of the disclosure are not limited thereto. For example, the illustrated electronic device may be a part of a rollable electronic device. The rollable electronic device may enable the display 110 to be bent and thus may be understood as an electronic device that has at least a part wound or rolled or received in the electronic device 100. The rollable electronic device may have the screen display area (for example, the flat area 111, the curved area 112) extended by spreading the display 110 or exposing a larger area of the display 110 to the outside according to user's need. The display 110 may be referred to as a slide-out display or an expandable display.

Figure 2:
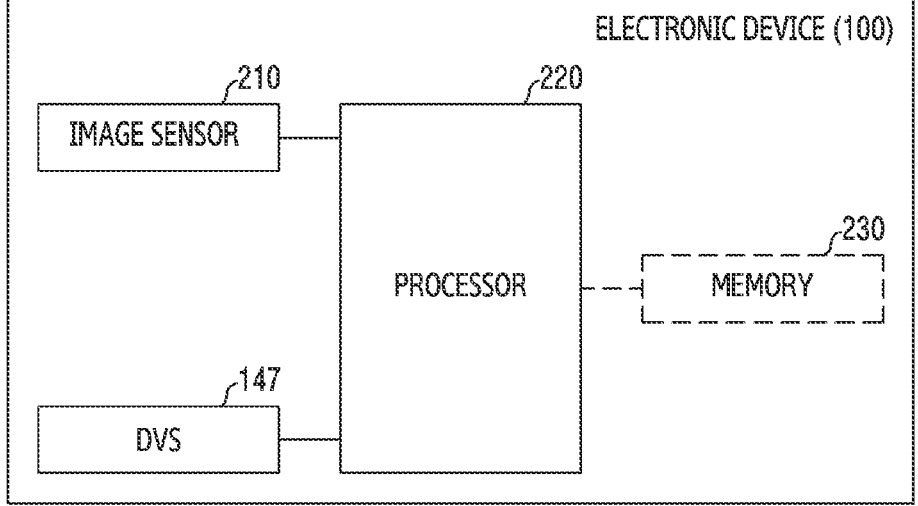
FIG. 2 is a block diagram illustrating a hardware configuration of the electronic device according to an embodiment.

FIG. 2 is a block diagram illustrating a hardware configuration of the electronic device 100, according to an embodiment.

Referring to FIG. 2, the electronic device 100 may include an image sensor 210, a DVS 147, and a processor 220. The electronic device 100 may further include a memory 230. The same components of FIG. 2 as those illustrated in FIG. 1 will not be explained or may be explained briefly.

The electronic device 100 may include the image sensor 210. The image sensor 210 may be understood as being included in the rear-facing camera 132. In another embodiment, the image sensor 210 may be understood as being included in the front-facing camera 131.

The image sensor 210 may be a complementary metal oxide semiconductor (CMOS) sensor or a charged coupled device (CCD) sensor. A plurality of individual pixels may be integrated into the image sensor 210, and each individual pixel may include a micro lens, a color filter, and a photodiode. Each individual pixel which is a kind of light detector may convert light entering the electronic device 100 into an electrical signal. The light detector may include a photodiode. For example, the image sensor 210 may amplify a current generated by light received through a lens assembly through photoelectric effect of a light receiving element. For example, each individual pixel may include a photoelectric transformation element (or a position sensitive detector (PSD)) and a plurality of transistors (for example, a reset transistor, a transmission transistor, a selection transistor, a driver transistor).

The image sensor 210 may acquire image data corresponding to light entering the electronic device 100. The image sensor 210 may provide an image frame including the image data to the processor 220. For example, the processor 220 may control the image sensor 210 to output a plurality of image frames including a subject, and the processor 220 may acquire the plurality of image frames from the image sensor 210.

The DVS 147 may be disposed on one surface of the electronic device 100 to face in the same direction as the image sensor 210. For example, the DVS 147 and the image sensor 210 may be disposed on a back surface of the rear surface of the electronic device 100 to face the rear surface of the electronic device 100. In another example, the DVS 147 and the image sensor 210 may be disposed on a back surface of at least one of the front surface, the side surface and/or the rear surface of the electronic device 100 to face at least one of the front surface, the side surface, and/or the rear surface.

A plurality of individual pixels may be integrated into the DVS 147. For example, the individual pixels included in the DVS 147 may be distinct from the individual pixels included in the image sensor 210. The DVS 147 may detect an event in which an intensity of light entering the electronic device 100 changes through the respective individual pixels, and may output event data corresponding to the event. For example, the DVS 147 may determine whether an event in which an intensity of light changes has occurred in each individual pixel, and may determine whether the event is an event in which the intensity of light increases or an event in which the intensity of light decreases. The DVS may determine that the event has occurred when the change in the intensity of light measured from the individual pixel is greater than or equal to a threshold. The DVS 147 may acquire event data based on the individual pixel from which the event is detected. The DVS 147 may provide the event data to the processor 220.

The DVS 147 may detect an event in which edge information of an image input to the electronic device 100 changes through each individual pixel, and may output event data corresponding to the event. For example, the DVS 147 may extract edge information from the image corresponding to light entering the electronic device 100, and, when the edge information changes by a predetermined level or more, the DVS 147 may determine that the event has occurred.

A capacity of the event data outputted by the DVS 147 may be smaller than a capacity of the image data output by the image sensor 210. For example, the event data may not include data related to an individual pixel of which the intensity of light measured does not change or a change of the intensity is less than the threshold.

The processor 220 may be understood as including at least one processor. For example, the processor 220 may include at least one of an application processor (AP), an image signal processor (ISP), and a communication processor (CP).

The memory 230 may store various programming languages or instructions by the processor 220. For example, the processor 220 may execute an application by executing a code written in a programming language stored in the memory 230, and may control a variety of hardware. In addition, the processor 220 may configure and support an appropriate photographing mode in order for the camera module (for example, the front-facing camera 131, the rear-facing camera 132 of FIG. 1) to perform an operation intended by a user. The processor 220 may store a plurality of image frames acquired from the image sensor 210 in the memory 230. In another embodiment, the processor 220 may store, in the memory 230, a hyperlapse video which is acquired based on the plurality of image frames acquired from the image sensor 210.

Figure 3:
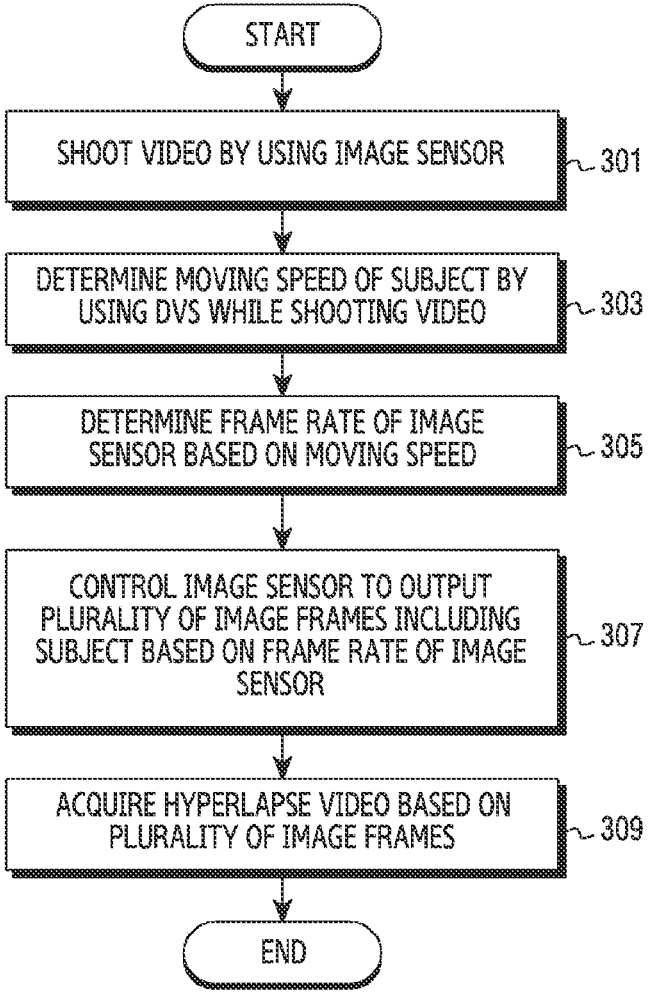
FIG. 3 is a flowchart illustrating an operation of acquiring a hyperlapse video by the electronic device, according to an embodiment.

FIG. 3 is a flowchart illustrating an operation of acquiring a hyperlapse video by the electronic device 100, according to an embodiment. The operation illustrated in FIG. 3 may be performed by the processor 220 illustrated in FIG. 2.

The processor 220 may shoot a video by using the image sensor 210 in step 301. For example, memory stories instructions that, when executed by the at least one processor 220, cause the electronic device 100 to shoot a video by using the image sensor 210.

The processor 220 may execute an application using the image sensor 210 and a camera module (for example, the rear-facing camera 132) including the image sensor 210. For example, the processor 220 may receive a user input to execute a camera application. The user input may include at least one of touching an icon of the camera application, clicking the first function key 151 or the second function key 152, and inputting a voice like "Turn on the camera" through voice recognition. The processor 220 may execute the camera application in response to at least one of the user inputs. The processor 220 may drive the camera module by executing the camera application, and may shoot a video by using the image sensor 210.

The processor 220 may determine a moving speed of a subject by using the DVS 147 while shooting the video in step 303. For example, memory stores instructions that, when executed by the at least one processor 220, cause the electronic device 100 to determine a moving speed of a subject by using the DVS 147 while shooting the video.

The processor 220 may detect a movement of the subject by using the DVS 147. For example, the processor 220 may acquire event data through the DVS 147. The event data may include information related to the movement of the subject. For example, the processor 220 may determine that the movement of the subject is detected in an area where an event in which the intensity of light changes has occurred in the event data. The processor 220 may determine the moving speed of the subject by analyzing the event data. For example, the processor 220 may determine whether the subject is moving through the DVS 147 and, when the subject is moving, the processor 220 may determine the moving speed of the subject.

The processor 220 may determine a frame rate of the image sensor 210 based on the moving speed.

The processor 220 may determine whether the moving speed of the subject is less than a designated value or is greater than or equal to the designated value. The moving speed of the subject and the designated value will be described below with reference to FIG. 4.

The processor 220 may determine the frame rate of the image sensor 210 as a first frame rate, in response to the moving speed of the subject being a first speed, and may determine the frame rate of the image sensor 210 as a second frame rate which is higher than the first frame rate in response to the moving speed of the subject being a second speed which is faster than the first speed. According to another embodiment, the processor 220 may determine the frame rate of the image sensor 210 as a first frame rate in response to the moving speed of the subject being a first speed, and may determine the frame rate of the image sensor 210 as a second frame rate which is lower than the first frame rate in response to the moving speed of the subject being a second speed which is faster than the first speed. For example, the processor 220 may determine the frame rate of the image sensor 210 to increase as the moving speed of the subject increases or, when the moving speed of the subject is included within a predetermined range, the processor 220 may determine the frame rate of the image sensor 210 to decrease as the moving speed increases. The processor 220 may store information related to the frame rate of the image sensor 210 depending on the moving speed of the subject in the memory 230 beforehand. The processor 220 may determine the frame rate of the image sensor 210 based on the moving speed determined in step 303 and the stored information. For example, the information stored in the memory 230 may be in the form of a lookup table.

The processor 220 may determine a playback speed of a hyperlapse video based on the moving speed of the subject. For example, when it is determined that the moving speed of the subject is a slow speed like a drifting cloud, the processor 220 may determine the playback speed of the hyperlapse video as 32× speed. In another example, when it is determined that the moving speed of the subject is a fast speed like a moving vehicle, the processor 220 may determine the playback speed of the hyperlapse video as 4× speed. The playback speed of the hyperlapse video may be understood as indicating a ratio of a time during which the hyperlapse video is played to a time during which the electronic device 100 actually shoots a video by using the image sensor 210. For example, when the electronic device 100 makes a hyperlapse video of 1 second based on image frames acquired by shooting for 16 seconds, the playback speed of the hyperlapse video may be understood as 16× speed.

The processor 220 may determine the frame rate of the image sensor 210 based on the playback speed of the hyperlapse video. For example, when it is determined that the playback speed of the hyperlapse video is 32× speed, the processor 220 may determine the frame rate of the image sensor 210 as 0.9375 frame per second (fps). For example, the processor 220 may determine the frame rate (for example, 0.9375 fps) of the image sensor 210 based on the frame rate (for example, 30 fps) of the hyperlapse video divided by the playback speed (for example, 32) of the hyperlapse video. In another example, when it is determined that the playback speed of the hyperlapse video is 4× speed, the processor 220 may determine the frame rate of the image sensor 210 as 7.5 fps. For example, the processor 220 may determine the frame rate (for example, 7.5 fps) of the image sensor 210 based on the frame rate (for example, 30 fps) of the hyperlapse video divided by the playback speed (for example, 4) of the hyperlapse video.

The processor 220 may determine the frame rate of the image sensor 210 based on the frame rate of the hyperlapse video with the playback speed of the hyperlapse video. For example, the processor 220 may determine the frame rate of the image sensor 210 based on a ratio between the playback speed of the hyperlapse video and the frame rate of the hyperlapse video. Equation (1) explains an example of a method for the processor 220 to determine the frame rate of the image sensor 210 based on the playback speed of the hyperlapse video and the frame rate of the hyperlapse video:

$$\text{Frame rate of image sensor} = \frac{\text{Frame rate of hyperlapse video}}{\text{Playback speed of hyperlapse video}} \quad (1)$$

Referring to FIG. 1, the processor 220 may determine the frame rate of the image sensor 210 by dividing the frame rate of the hyperlapse video by the playback speed of the hyperlapse video. The frame rate of the hyperlapse video may be 30 fps. For example, when it is determined that the playback speed of the hyperlapse video is 32× speed, the processor 220 may determine the frame rate of the image sensor 210 as 30/32=0.9375 fps. In another example, when it is determined that the playback speed of the hyperlapse video is 4× speed, the processor 220 may determine the frame rate of the image sensor 210 as 30/4=7.5 fps.

The moving speed of the subject, the playback speed of the hyperlapse video, the frame rate of the hyperlapse video and the frame rate of the image sensor 210 described in relation to step 305 are examples, and various embodiments that may be implemented by a person skilled in the art are possible. For example, the processor 220 may determine the frame rate of the image sensor 210 to decrease as the moving speed of the subject increases. In another example, the frame rate of the hyperlapse video may be 24 fps or 60 fps. For example, memory stores instructions that, when executed by the at least one processor 220, cause the electronic device 100 to determine the frame rate of the image sensor 210 to decrease as the moving speed of the subject increases.

The processor 220 may control the image sensor 210 to output a plurality of image frames including the subject, based on the frame rate of the image sensor 210 in step 307.

For example, memory stores instructions that, when executed by the at least one processor 220, cause the electronic device 100 to control the image sensor 210 to output a plurality of image frames including the subject, based on the frame rate of the image sensor 210 in step 307.

The processor 220 may shoot the video based on the determined frame rate of the image sensor 210. The processor 220 may control the image sensor 210 to output image frames according to the determined frame rate of the image sensor 210. For example, the processor 220 may provide information on the frame rate of the image sensor 210 which is determined in step 305 to the image sensor 210.

The image sensor 210 may acquire a plurality of image frames including the subject under control of the processor 220. For example, the image sensor 210 may acquire the plurality of image frames based on information on the frame rate of the image sensor 210 which is acquired from the processor 220.

The processor 220 may acquire a hyperlapse video based on the plurality of image frames in step 309. For example, memory stores instructions that, when executed by the at least one processor 220, cause the electronic device 100 to acquire a hyperlapse video based on the plurality of image frames in step 309.

The processor 220 may acquire the plurality of image frames including the subject from the image sensor 210. The processor 220 may create the hyperlapse video including the plurality of image frames. For example, the processor 220 may acquire the hyperlapse video including the subject which moves faster than its actual speed.

The processor 220 may acquire the hyperlapse image based on the plurality of image frames acquired from the image sensor 210 without a sampling process. For example, a related-art electronic device may drop a part of image frames acquired from an image sensor and may generate a hyperlapse video based on the other part of the image frames. The electronic device 100 may not acquire unnecessary image frames from the image sensor 210 and may omit a sampling process of dropping a part of the image frames. As the sampling process is omitted, a capacity of data output by the image sensor 210 may be reduced and current consumption of the image sensor 210 may be reduced, and accordingly, battery consumption may be reduced.

The processor 220 may store the hyperlapse video in the memory 230. For example, the processor 220 may store the hyperlapse video generated based on the plurality of image frames in the memory 230 in response to a user input to store the hyperlapse video being received. The processor 220 may display the hyperlapse video stored in the memory 230 on the display 110. For example, the processor 220 may display the hyperlapse video on the display 110 in response to a user input to replay the hyperlapse video being received while executing a gallery application.

Figure 4:
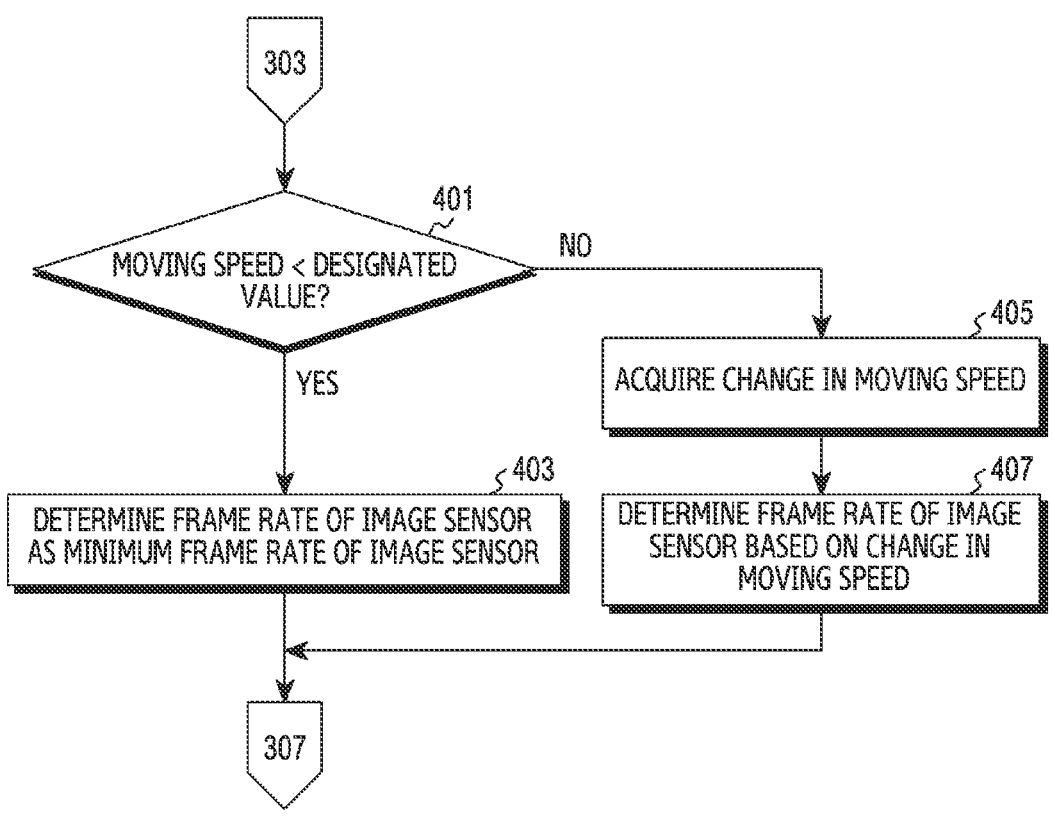
FIG. 4 is a flowchart illustrating an operation of determining a frame rate of an image sensor according to a moving speed of a subject by the electronic device, according to an embodiment.

FIG. 4 is a flowchart illustrating an operation of determining a frame rate of the image sensor 210, according to a moving speed of a subject in the electronic device 100 according to an embodiment. The operation illustrated in FIG. 4 may be performed by the processor 220 illustrated in FIG. 2.

The processor 220 may determine whether the moving speed of the subject determined in step 303 of FIG. 3 is less than a designated value or is greater than or equal to the designated value. For example, memory stores instructions that, when executed by the at least one processor 220, cause the electronic device 100 to determine whether the moving speed of the subject determined in step 303 of FIG. 3 is less than a designated value or is greater than or equal to the designated value. Referring to FIG. 4, the processor 220 may determine the frame rate of the image sensor 210 based on whether the moving speed of the subject is less than the designated value or is greater than or equal to the designated value.

The processor 220 may determine whether the moving speed of the subject is less than the designated value in step 401. For example, memory stores instructions that, when executed by the at least one processor 220, cause the electronic device 100 to determine whether the moving speed of the subject is less than the designated value in step 401. For example, when a movement of the subject is not detected through the DVS 147, the processor 220 may determine that the moving speed of the subject is less than the designated value. In another example, when a movement of the subject is detected through the DVS 147 but the movement is so small that it is ignored, the processor 220 may determine that the moving speed of the subject is less than the designated value. The designated value may be referred to as a first value.

The processor 220 may determine the frame rate of the image sensor 210 as a minimum frame rate of the image sensor 210 in response to it being determined that the moving speed is less than the designated value in step 403. For example, memory stores instructions that, when executed by the at least one processor 220, cause the electronic device 100 to determine the frame rate of the image sensor 210 as a minimum frame rate of the image sensor 210 in response to it being determined that the moving speed is less than the designated value in step 403.

When the moving speed of the subject, which is determined by the processor 220 through the DVS 147, is less than the designated value (for example, the first value), the image frames that are acquired by the image sensor 210 may be substantially the same image frames. Substantially the same image frames may indicate that there is no difference in positions and sizes of the subject included in the image frames or a difference is so small that it is ignored. For example, when the moving speed of the subject is less than the designated value (for example, the first value), there may be no difference of a predetermined level or more between the image frames acquired by the image sensor 210 and there may be no need to acquire a new image frame. For example, when the subject is out of an FOV of the DVS 147, the processor 220 may determine that the moving speed of the subject is less than the designated value (for example, the first value).

The processor 220 may determine the frame rate of the image sensor 210 as a minimum frame rate of the image sensor 210. The minimum frame rate of the image sensor 210 may be determined by hardware characteristics of the image sensor 210 or an application controlling the image sensor 210. The processor 220 may control the image sensor 210 to output a plurality of image frames based on the minimum frame rate of the image sensor 210. The image sensor 210 may provide the plurality of image frames which are acquired based on the minimum frame rate of the image sensor 210 to the processor 220.

The processor 220 may acquire a change of the moving speed in response to it being determined that the moving speed is greater than or equal to the designated value (for example, the first value) in step 405. For example, memory stores instructions that, when executed by the at least one processor 220, cause the electronic device 100 to acquire a change of the moving speed in response to it being determined that the moving speed is greater than or equal to the designated value (for example, the first value) in step 405.

When the moving speed of the subject determined by the processor 220 through the DVS 147 is greater than or equal to the designated value (for example, the first value), the image frames acquired by the image sensor 210 may be image frames that are not substantially the same. For example, when the moving speed of the subject is greater than or equal to the designated value (for example, the first value), there may be a difference of a predetermined level or more between the image frames acquired by the image sensor 210 and there may be a need to acquire a new image frame. For example, when the position or size of the subject within the FOV of the DVS 147 changes to the extent that it is not ignored, the processor 220 may determine that the moving speed of the subject is greater than or equal to the designated value (for example, the first value).

The processor 220 may acquire a change in the moving speed of the subject. For example, the processor 220 may determine the moving speed of the subject as a first speed at a first time point by using the DVS 147, and may determine the frame rate of the image sensor 210 as a first frame rate based on the first speed. The processor 220 may determine the moving speed of the subject as a second speed at a second time point which follows the first time point by using the DVS 147. The processor 220 may determine that the second speed is greater than or equal to the designated value (for example, the first value) in relation to step 401. The processor 220 may calculate a difference value between the second speed and the first speed in relation to step 405. The first speed and the second speed described in relation to FIG. 4 may be understood as being distinct from the first speed and the second speed described in relation to FIG. 3.

The processor 220 may determine the frame rate of the image sensor 210 based on the change in the moving speed in step 407. For example, memory stores instructions that, when executed by the at least one processor 220, cause the electronic device 100 to determine the frame rate of the image sensor 210 based on the change in the moving speed in step 407.

The processor 220 may determine the frame rate of the image sensor 210 based on an extent of the change in the moving speed. The processor 220 may determine whether the change in the moving speed is less than a second value. The second value may be a value that is distinct from the first value described in relation to step 401 of FIG. 4. For example, the processor 220 may determine the frame rate of the image sensor 210 based on a difference value between the second speed and the first speed.

The processor 220 may determine the frame rate of the image sensor 210 as a first frame rate in response to the difference value between the second speed and the first speed satisfying a designated condition. For example, the processor 220 may maintain the frame rate of the image sensor 210 as it is in response to it being determined that the change in the moving speed is less than the second value. When it is determined that there is no difference between the second speed and the first speed, the processor 220 may maintain the frame rate of the image sensor 210 as the first frame rate. When it is determined that there is no difference between the second speed and the first speed, it may indicate that there is a difference between the second speed and the first speed but the difference is so small that it is ignored.

The processor 220 may determine the frame rate of the image sensor 210 as a second frame rate which is distinct from the first frame rate in response to the difference value between the second speed and the first speed not satisfying the designated condition. For example, the processor 220 may change the frame rate of the image sensor 210 in response to it being determined that the change in the moving speed is greater than or equal to the second value. When it is determined that there is a difference between the second speed and the first speed, the processor 220 may determine the frame rate of the image sensor 210 as the second frame rate based on the first frame rate and the second speed.

Figure 5:
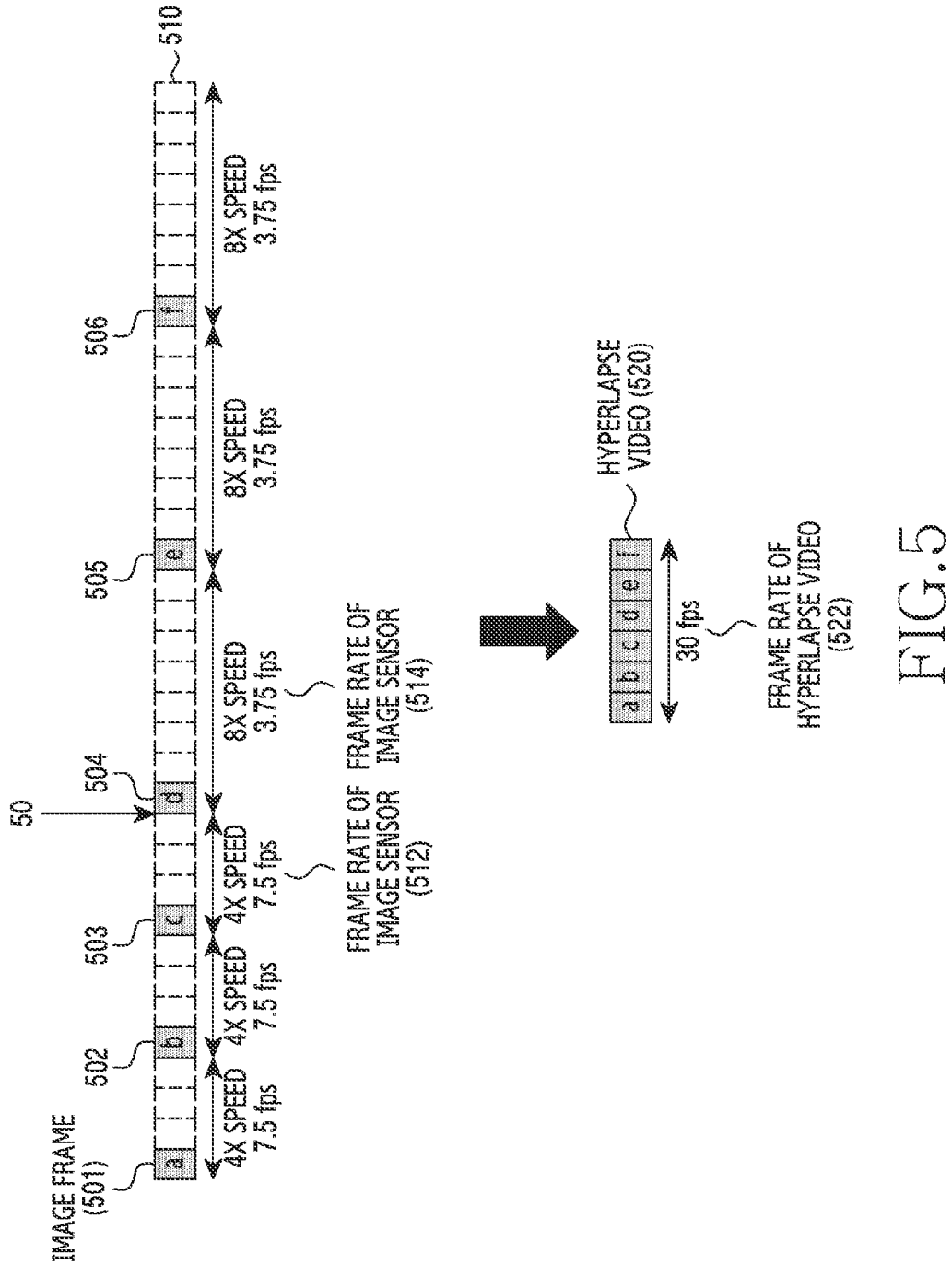
FIG. 5 illustrates an example of a hyperlapse video that is created based on a plurality of image frames outputted by the image sensor, according to an embodiment.

FIG. 5 illustrates an example of a hyperlapse video 520 which is generated based on a plurality of image frames 501, 502, 503, 505, and 506 output by the image sensor 210, according to an embodiment.

The processor 220 may determine a moving speed of a subject by using the DVS 147 while shooting a video, may determine a frame rate 512, 514 of the image sensor based on the moving speed, and may control the image sensor 210 to output a plurality of image frames 501, 502, 503, 504, 505, and 506 including a subject, based on the frame rate 512, 514 of the image sensor. The image sensor 210 may output the plurality of image frames 501, 502, 503, 504, 505, and 506 corresponding to the frame rate 512, 514 of the image sensor under control of the processor 220.

The processor 220 may determine the moving speed of the subject by using the DVS 147. The processor 220 may determine a playback speed of the hyperlapse video as 4× speed based on the moving speed of the subject. The processor 220 may determine the frame rate 512 of the image sensor as 7.5 fps based on the 4× speed. For example, referring to Equation (1), the processor 220 may determine the frame rate 512 of the image sensor as 30/4=7.5 fps based on the 4× speed and a frame rate 522 of the hyperlapse video. The image sensor 210 may output the image frames 501, 502, and 503 at 7.5 fps.

The processor 220 may detect a change in the moving speed of the subject through the DVS 147 while shooting the video. For example, the processor 220 may determine that the moving speed of the subject determined through the DVS 147 is greater than or equal to a first value and the change in the moving speed of the subject is greater than or equal to a second value. The processor 220 may determine the frame rate 514 of the image sensor based on the changed moving speed of the subject. For example, the processor 220 may determine the playback speed of the hyperlapse video as 8× speed based on the changed moving speed of the subject. The processor 220 may determine the frame rate 514 of the image sensor as 3.75 fps based on the 8× speed. For example, referring to Equation (1), the processor 220 may determine the frame rate 514 of the image sensor as 30/8=3.75 fps based on the 8× speed and the frame rate 522 of the hyperlapse video. The processor 220 may control the image sensor 210 to change the frame rate 512 of the image sensor at a first reference point 50. The first reference point may be a time point at which a specific condition is satisfied. In addition, the image sensor 210 may output the image frames 504, 505, and 506 at 3.75 fps from the first reference point 50.

The processor 220 may acquire a hyperlapse video 520 based on the plurality of image frames 501, 502, 503, 504, 505, and 506 acquired from the image sensor 210. The frame rate 522 of the hyperlapse video may be 30 fps.

The processor 220 may acquire the hyperlapse video 520 based on the plurality of image frames 501, 502, 503, 504, 505, and 506 acquired from the image sensor 210 without a sampling process. For example, referring to reference numeral 510, the electronic device 100 may change the frame rate 512, 514 of the image sensor while shooting the video, and accordingly, the image sensor 210 may not output unnecessary image frames. The image sensor 210 may neither acquire nor output other image frames than the image frames 501, 502, 503, 504, 505 or 506 included in the hyperlapse video 520. The processor 220 may omit a sampling process of dropping some of the image frames acquired from the image sensor 210. A capacity of data processed by the processor 220 may be reduced and current consumption of the image sensor 210 may be reduced, and battery consumption may be reduced.

Figure 6:
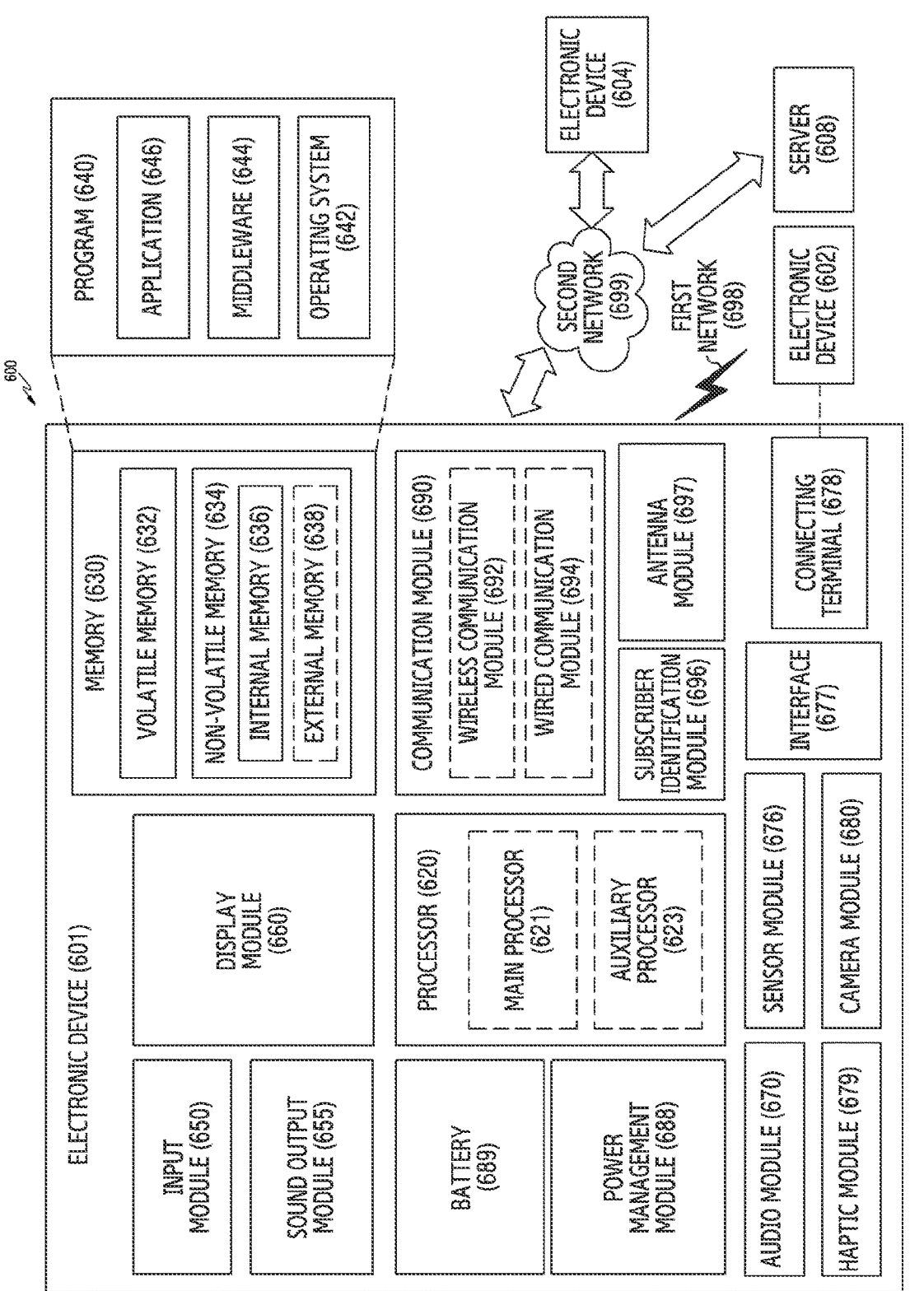
FIG. 6 is a block diagram of an electronic device in a network environment, according to an embodiment.

FIG. 6 is a block diagram illustrating an electronic device 601 in a network environment 600, according to an embodiment.

Referring to FIG. 6, the electronic device 601 in the network environment 600 may communicate with an electronic device 602 via a first network 698 (e.g., a short-range wireless communication network), or at least one of an electronic device 604 or a server 608 via a second network 699 (e.g., a long-range wireless communication network). The electronic device 601 may communicate with the electronic device 604 via the server 608. The electronic device 601 may include a processor 620, memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module (SIM) 696, or an antenna module 697. In some embodiments, at least one of the components (e.g., the connecting terminal 678) may be omitted from the electronic device 601, or one or more other components may be added in the electronic device 601. In some embodiments, some of the components (e.g., the sensor module 676, the camera module 680, or the antenna module 697) may be implemented as a single component (e.g., the display module 660).

The processor 620 may execute, for example, software (e.g., a program 640) to control at least one other component (e.g., a hardware or software component) of the electronic device 601 coupled with the processor 620, and may perform various data processing or computation. As at least part of the data processing or computation, the processor 620 may store a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an AP), or an auxiliary processor 623 (e.g., a graphics processing unit (GPU), a neural processing unit (NPU), an ISP, a sensor hub processor, or a CP) that is operable independently from, or in conjunction with, the main processor 621. For example, when the electronic device 601 includes the main processor 621 and the auxiliary processor 623, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display module 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an ISP or a CP) may be implemented as part of another component (e.g., the camera module 680 or the communication module 690) functionally related to the auxiliary processor 623. The auxiliary processor 623 (e.g., the neural processing unit) may include a hardware structure specified for artificial intelligence (AI) model processing. An AI model may be generated by machine learning. Such learning may be performed, e.g., by the electronic device 601 where the AI is performed or via a separate server (e.g., the server 608). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The AI model may, additionally or alternatively, include a software structure other than the hardware structure.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input module 650 may receive a command or data to be used by another component (e.g., the processor 620) of the electronic device 601, from the outside (e.g., a user) of the electronic device 601. The input module 650 may include, for example, a microphone, a mouse, a keyboard, a key (e.g., a button), or a digital pen (e.g., a stylus pen).

The sound output module 655 may output sound signals to the outside of the electronic device 601. The sound output module 655 may include, for example, a speaker or a receiver. The speaker may be used for general purposes, such as playing multimedia or playing record. The receiver may be used for receiving incoming calls. The receiver may be implemented as separate from, or as part of the speaker.

The display module 660 may visually provide information to the outside (e.g., a user) of the electronic device 601. The display module 660 may include, for example, a display, a hologram device, or a projector and control circuitry to control a corresponding one of the display, hologram device, and projector. The display module 660 may include a touch sensor adapted to detect a touch, or a pressure sensor adapted to measure the intensity of force incurred by the touch.

The audio module 670 may convert a sound into an electrical signal and vice versa. The audio module 670 may obtain the sound via the input module 650, or output the sound via the sound output module 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. The interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. The haptic module 679 may include, for example, a motor, a piezoelectric element, or an electric stimulator.

The camera module 680 may capture a still image or moving images. The camera module 680 may include one or more lenses, image sensors, ISPs, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the SIM 696.

The wireless communication module 692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 692 may support a high-frequency band (e.g., the mmWave band) to achieve, e.g., a high data transmission rate. The wireless communication module 692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 692 may support various requirements specified in the electronic device 601, an external electronic device (e.g., the electronic device 604), or a network system (e.g., the second network 699). The wireless communication module 692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 697 may transmit or receive a signal or power to or from the outside (e.g., the external electronic device) of the electronic device 601. The antenna module 697 may include an antenna including a radiating element composed of a conductive material or a conductive pattern formed in or on a substrate (e.g., a printed circuit board (PCB)). The antenna module 697 may include a plurality of antennas (e.g., array antennas). In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. Another component (e.g., a radio frequency integrated circuit (RFIC)) other than the radiating element may be additionally formed as part of the antenna module 697.

The antenna module 697 may form a mmWave antenna module. The mmWave antenna module may include a printed circuit board (PCB), an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 or 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, mobile edge computing (MEC), or client-server computing technology may be used, for example. The electronic device 601 may provide ultra low-latency services using, e.g., distributed computing or mobile edge computing. The external electronic device 604 may include an Internet-of-things (IoT) device. The server 608 may be an intelligent server using machine learning and/or a neural network. The external electronic device 604 or the server 608 may be included in the second network 699. The electronic device 601 may be applied to intelligent services (e.g., smart home, smart city, smart car, or health-care) based on 5G communication technology or IoT-related technology.

An electronic device may include an image sensor; a dynamic vision sensor (DVS); and at least one processor electrically connected with the image sensor and the DVS. The at least one processor may shoot a video by using the image sensor, may determine a moving speed of a subject by using the DVS while shooting the video, may determine a frame rate of the image sensor based on the moving speed, may control the image sensor to output a plurality of image frames including the subject, based on the frame rate of the image sensor, and may acquire a hyperlapse video based on the plurality of image frames.

The at least one processor may determine the frame rate of the image sensor as a minimum frame rate of the image sensor in response to it being determined that the moving speed is less than a designated value.

The at least one processor may acquire a change in the moving speed in response to it being determined that the moving speed is greater than or equal to the designated value; and may determine the frame rate of the image sensor based on the change in the moving speed.

The at least one processor may determine a playback speed of the hyperlapse video based on the moving speed, and may determine the frame rate of the image sensor based on the playback speed of the hyperlapse video.

The at least one processor may determine the frame rate of the image sensor based on a frame rate of the hyperlapse video along with the playback speed of the hyperlapse video.

The frame rate of the hyperlapse video may be 30 frame per second (fps).

The at least one processor may determine the frame rate of the image sensor as a first frame rate in response to the moving speed being a first speed, and may determine the frame rate of the image sensor as a second frame rate which is higher than the first frame rate in response to the moving speed being a second speed which is faster than the first speed.

The electronic device may further include a memory electrically connected with the at least one processor, and the at least one processor may store the hyperlapse video in the memory.

According to an embodiment, an operating method of an electronic device may include shooting a video by using an image sensor included in the electronic device; determining a moving speed of a subject by using a DVS included in the electronic device while shooting the video; determining a frame rate of the image sensor based on the moving speed; controlling the image sensor to output a plurality of image frames including the subject, based on the frame rate of the image sensor; and acquiring a hyperlapse video based on the plurality of image frames.

In the operating method, determining the frame rate of the image sensor based on the moving speed may include determining the frame rate of the image sensor as a minimum frame rate of the image sensor in response to it being determined that the moving speed is less than a designated value.

In the operating method, determining the frame rate of the image sensor based on the moving speed may include acquiring a change in the moving speed in response to it being determined that the moving speed is greater than or equal to the designated value; and determining the frame rate of the image sensor based on the change in the moving speed.

In the operating method, determining the frame rate of the image sensor based on the moving speed may include determining a playback speed of the hyperlapse video based on the moving speed; and determining the frame rate of the image sensor based on the playback speed of the hyperlapse video.

In the operating method, determining the frame rate of the image sensor based on the moving speed may include determining the frame rate of the image sensor based on a frame rate of the hyperlapse video along with the playback speed of the hyperlapse video.

In the operating method, determining the frame rate of the image sensor based on the moving speed may include determining the frame rate of the image sensor as a first frame rate in response to the moving speed being a first speed; and determining the frame rate of the image sensor as a second frame rate which is higher than the first frame rate in response to the moving speed being a second speed which is faster than the first speed.

The operating method of the electronic device according to an embodiment may include storing the hyperlapse video in a memory included in the electronic device.

According to an embodiment, an electronic device may include an image sensor; a DVS; and at least one processor electrically connected with the image sensor and the DVS. The at least one processor may shoot a video by using the image sensor, may determine a moving speed of a subject by using the DVS while shooting the video, may determine a playback speed of a hyperlapse video based on the moving speed, may determine a frame rate of the image sensor based on the playback speed and a frame rate of the hyperlapse video, may control the image sensor to output a plurality of image frames including the subject, based on the frame rate of the image sensor, and may acquire the hyperlapse video based on the plurality of image frames.

The at least one processor may acquire the hyperlapse video based on the plurality of image frames without a sampling process.

The at least one processor may determine the frame rate of the image sensor based on a ratio between the playback speed and the frame rate of the hyperlapse video.

The at least one processor may determine the frame rate of the image sensor as a first frame rate in response to it being determined that the moving speed is a first speed at a first time point, may determine that the moving speed is a second speed at a second time point which follows the first time point, and may acquire a difference value between the second speed and the first speed in response to it being determined that the second speed is greater than or equal to a designated value.

The at least one processor may determine the frame rate of the image sensor as the first frame rate in response to the difference value satisfying a designated condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 7:
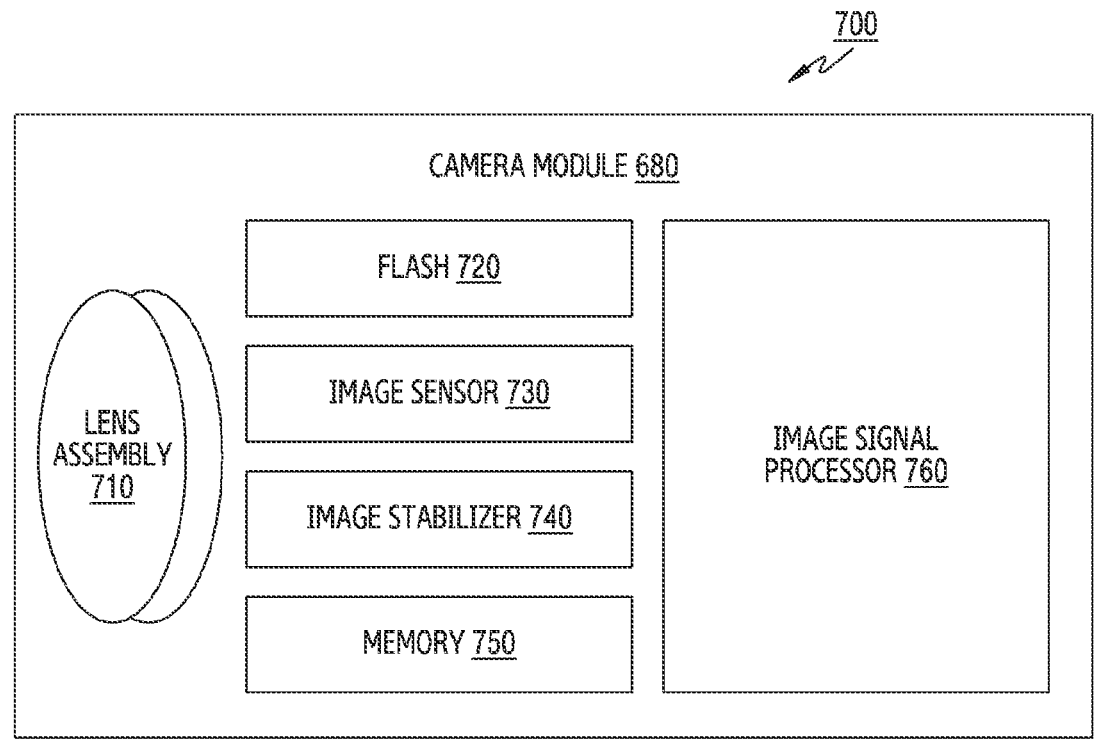
FIG. 7 is a block diagram illustrating a camera module, according to an embodiment.

FIG. 7 is a block diagram 700 illustrating the camera module 680, according to an embodiment.

Referring to FIG. 7, the camera module 680 may include a lens assembly 710, a flash 720, an image sensor 730, an image stabilizer 740, memory 750 (e.g., buffer memory), or an ISP 760. The lens assembly 710 may collect light emitted or reflected from an object whose image is to be taken. The lens assembly 710 may include one or more lenses. The camera module 680 may include a plurality of lens assemblies 710. In such a case, the camera module 680 may form, for example, a dual camera, a 360-degree camera, or a spherical camera. Some of the plurality of lens assemblies 710 may have the same lens attribute (e.g., view angle, focal length, auto-focusing, f number, or optical zoom), or at least one lens assembly may have one or more lens attributes different from those of another lens assembly. The lens assembly 710 may include, for example, a wide-angle lens or a telephoto lens.

The flash 720 may emit light that is used to reinforce light reflected from an object. The flash 720 may include one or more light emitting diodes (LEDs) (e.g., a red-green-blue (RGB) LED, a white LED, an IR LED, or an ultraviolet (UV) LED) or a xenon lamp. The image sensor 730 may obtain an image corresponding to an object by converting light emitted or reflected from the object and transmitted via the lens assembly 710 into an electrical signal. The image sensor 730 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 730 may be implemented using, for example, a CCD sensor or a CMOS sensor.

The image stabilizer 740 may move the image sensor 730 or at least one lens included in the lens assembly 710 in a particular direction, or control an operational attribute (e.g., adjust the read-out timing) of the image sensor 730 in response to the movement of the camera module 680 or the electronic device 601 including the camera module 680. This allows compensating for at least part of a negative effect (e.g., image blurring) by the movement on an image being captured. The image stabilizer 740 may sense such a movement by the camera module 680 or the electronic device 601 using a gyro sensor or an acceleration sensor disposed inside or outside the camera module 680. The image stabilizer 740 may be implemented, for example, as an optical image stabilizer. The memory 750 may store, at least temporarily, at least part of an image obtained via the image sensor 730 for a subsequent image processing task. For example, if image capturing is delayed due to shutter lag or multiple images are quickly captured, a raw image obtained (e.g., a Bayer-patterned image, a high-resolution image) may be stored in the memory 750, and its corresponding copy image (e.g., a low-resolution image) may be previewed via the display module 660. Thereafter, if a specified condition is met (e.g., by a user's input or system command), at least part of the raw image stored in the memory 750 may be obtained and processed, for example, by the ISP 760. The memory 750 may be configured as at least part of the memory 630 or as a separate memory that is operated independently from the memory 630.

The ISP 760 may perform one or more image processing with respect to an image obtained via the image sensor 730 or an image stored in the memory 750. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 760 may perform control (e.g., exposure time control or read-out timing control) with respect to at least one (e.g., the image sensor 730) of the components included in the camera module 680. An image processed by the ISP 760 may be stored back in the memory 750 for further processing, or may be provided to an external component (e.g., the memory 630, the display module 660, the electronic device 602, the electronic device 604, or the server 608) outside the camera module 680. The ISP 760 may be configured as at least part of the processor 620, or as a separate processor that is operated independently from the processor 620. If the ISP 760 is configured as a separate processor from the processor 620, at least one image processed by the ISP 760 may be displayed, by the processor 620, via the display module 660 as it is or after being further processed.

The electronic device 601 may include a plurality of camera modules 680 having different attributes or functions. In such a case, at least one of the plurality of camera modules 680 may form, for example, a wide-angle camera and at least another of the plurality of camera modules 680 may form a telephoto camera. Similarly, at least one of the plurality of camera modules 680 may form, for example, a front camera and at least another of the plurality of camera modules 680 may form a rear camera.

While the present disclosure has been shown and described with reference to various embodiments of the present disclosure, those skilled in the art may appreciate that, without departing from the spirit and scope of the present disclosure as defined by the appended claims and their equivalents, variations may be made to the form and detail thereof.

What is claimed is:

1. An electronic device comprising:
an image sensor;
a dynamic vision sensor (DVS); and
at least one processor electrically connected with the image sensor and the DVS,
wherein memory stores instructions that, when executed by the at least one processor, cause the electronic device to:
shoot a video by using the image sensor,
determine a moving speed of a subject by using the DVS while shooting the video,
determine a frame rate of the image sensor from a first frame rate to a second frame rate which is higher than the first frame rate, based on the moving speed being a second moving speed of the subject which is faster than a first moving speed of the subject,
control the image sensor to output a plurality of image frames including the subject, based on the frame rate of the image sensor, and
acquire a hyperlapse video based on the plurality of image frames.

2. The electronic device of claim 1, wherein the instructions, when executed by the at least one processor, further cause the electronic device to determine the frame rate of the image sensor as a minimum frame rate of the image sensor in response to it being determined that the moving speed is less than a designated value.

3. The electronic device of claim 2, wherein the instructions, when executed by the at least one processor, further cause the electronic device to:
acquire a change in the moving speed in response to it being determined that the moving speed is greater than or equal to the designated value, and
determine the frame rate of the image sensor based on the change in the moving speed.

4. The electronic device of claim 1, wherein the instructions, when executed by the at least one processor, further cause the electronic device to determine a playback speed of the hyperlapse video based on the moving speed, and to determine the frame rate of the image sensor based on the playback speed of the hyperlapse video.

5. The electronic device of claim 4, wherein the instructions, when executed by the at least one processor, further cause the electronic device to determine the frame rate of the image sensor based on a frame rate of the hyperlapse video along with the playback speed of the hyperlapse video.

6. The electronic device of claim 5, wherein the frame rate of the hyperlapse video is 30 frame per second (fps).

7. The electronic device of claim 1, wherein the instructions, when executed by the at least one processor, further cause the electronic device to:

determine the frame rate of the image sensor as a first frame rate in response to the moving speed being a first speed, and determine the frame rate of the image sensor as a second frame rate which is higher than the first frame rate in response to the moving speed being a second speed which is faster than the first speed.

8. The electronic device of claim 1, further comprising the memory is electrically connected with the at least one processor, wherein the instructions, when executed by the at least one processor, further cause the electronic device to store the hyperlapse video in the memory.

9. An operating method of an electronic device, the method comprising:

shooting a video by using an image sensor included in the electronic device;

determining a moving speed of a subject by using a dynamic vision sensor (DVS) included in the electronic device while shooting the video;

determining a frame rate of the image sensor from a first frame rate to a second frame rate which is higher than the first frame rate, based on the moving speed being a second moving speed of the subject which is faster than a first moving speed of the subject;

controlling the image sensor to output a plurality of image frames including the subject, based on the frame rate of the image sensor; and acquiring a hyperlapse video based on the plurality of image frames.

10. The method of claim 9, wherein determining the frame rate of the image sensor based on the moving speed comprises determining the frame rate of the image sensor as a minimum frame rate of the image sensor in response to it being determined that the moving speed is less than a designated value.

11. The method of claim 10, wherein determining the frame rate of the image sensor based on the moving speed comprises:

acquiring a change in the moving speed in response to it being determined that the moving speed is greater than or equal to the designated value; and determining the frame rate of the image sensor based on the change in the moving speed.

12. The method of claim 9, wherein determining the frame rate of the image sensor based on the moving speed comprises:

determining a playback speed of the hyperlapse video based on the moving speed; and determining the frame rate of the image sensor based on the playback speed of the hyperlapse video.

13. The method of claim 12, wherein determining the frame rate of the image sensor based on the moving speed comprises determining the frame rate of the image sensor based on a frame rate of the hyperlapse video along with the playback speed of the hyperlapse video.

14. The method of claim 9, wherein determining the frame rate of the image sensor based on the moving speed comprises:

determining the frame rate of the image sensor as a first frame rate in response to the moving speed being a first speed; and determining the frame rate of the image sensor as a second frame rate which is higher than the first frame rate in response to the moving speed being a second speed which is faster than the first speed.

15. The method of claim 9, further comprising storing the hyperlapse video in a memory included in the electronic device.

16. An electronic device comprising:

an image sensor;

a dynamic vision sensor (DVS);

at least one processor electrically connected with the image sensor and the DVS; and memory storing instructions that, when executed by the at least one processor, cause the electronic device to:

shoot a video by using the image sensor, determine a moving speed of a subject by using the DVS while shooting the video, determine a playback speed of a hyperlapse video based on the moving speed, determine a frame rate of the image sensor from a first frame rate to a second frame rate which is higher than the first frame rate, based on the playback speed being based on a second moving speed of the subject which is faster than a first moving speed of the subject, and a frame rate of the hyperlapse video, control the image sensor to output a plurality of image frames including the subject, based on the frame rate of the image sensor, and acquire the hyperlapse video based on the plurality of image frames.

17. The electronic device of claim 16, wherein the instructions, when executed by the at least one processor, further cause the electronic device to acquire the hyperlapse video based on the plurality of image frames without a sampling process.

18. The electronic device of claim 16, wherein the instructions, when executed by the at least one processor, further cause the electronic device to determine the frame rate of the image sensor based on a ratio between the playback speed and the frame rate of the hyperlapse video.

19. The electronic device of claim 16, wherein the instructions, when executed by the at least one processor, further cause the electronic device to:

determine the frame rate of the image sensor as a first frame rate in response to it being determined that the moving speed is a first speed at a first time point, determine that the moving speed is a second speed at a second time point which follows the first time point, and acquire a difference value between the second speed and the first speed in response to it being determined that the second speed is greater than or equal to a designated value.

20. The electronic device of claim 19, wherein the instructions, when executed by the at least one processor, further cause the electronic device to determine the frame rate of the image sensor as the first frame rate in response to the difference value satisfying a designated condition.

* * * * *